US010127228B2

(12) United States Patent
Hampson et al.

(10) Patent No.: US 10,127,228 B2
(45) Date of Patent: Nov. 13, 2018

(54) TECHNIQUES FOR PROACTIVELY PROVIDING TRANSLATED TEXT TO A TRAVELING USER

(71) Applicant: Google LLC, Mountain View, CA (US)

(72) Inventors: Courtney Hampson, Sunnyvale, CA (US); Jason Sanio, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/097,392

(22) Filed: Apr. 13, 2016

(65) Prior Publication Data

US 2017/0300476 A1 Oct. 19, 2017

(51) Int. Cl.
| | |
|---|---|
| *G06F 17/28* | (2006.01) |
| *G06N 7/00* | (2006.01) |
| *H04L 29/06* | (2006.01) |
| *G01C 21/36* | (2006.01) |
| *G06Q 10/04* | (2012.01) |
| *G06Q 50/30* | (2012.01) |
| *H04M 1/725* | (2006.01) |
| *G06F 9/451* | (2018.01) |

(52) U.S. Cl.
CPC ..... *G06F 17/2836* (2013.01); *G01C 21/3644* (2013.01); *G06F 9/454* (2018.02); *G06F 17/289* (2013.01); *G06N 7/005* (2013.01); *G06Q 10/04* (2013.01); *G06Q 50/30* (2013.01); *H04L 67/42* (2013.01); *H04M 1/72572* (2013.01)

(58) Field of Classification Search
CPC ................................................... H04L 29/0881
See application file for complete search history.

(56) References Cited

U.S. PATENT DOCUMENTS

| | | | |
|---|---|---|---|
| 8,086,999 B2 | 12/2011 | Berstis et al. | |
| 8,326,793 B1 * | 12/2012 | Bowers | G06F 9/50 |
| | | | 706/45 |
| 8,417,443 B2 | 4/2013 | Ishikawa | |
| 8,454,055 B2 | 6/2013 | Cheng et al. | |
| 8,954,092 B2 | 2/2015 | Kirmse et al. | |
| 9,414,222 B1 * | 8/2016 | Dixon | H04L 67/00 |

(Continued)

OTHER PUBLICATIONS

PCT International Search Report and Written Opinion dated Apr. 20, 2017 for PCT International Application No. PCT/US2016/069242, 10 pages.

*Primary Examiner* — Michael L Opsasnick
(74) *Attorney, Agent, or Firm* — Fish & Richardson P.C.

(57) ABSTRACT

Computer-implemented techniques can include obtaining future travel plans for a user in a region that utilizes a language that is foreign to the user and predicting, based on the future travel plans, an expected future offline period during which the user is unlikely to have access to a network connection via a client computing device. The techniques can include identifying one or more points of interest in future the travel plans in the expected future offline period where the user is likely to require translation of foreign language text and obtaining portions of foreign language text associated therewith. The techniques can also include, prior to the expected future offline period, obtaining translated portions of text representing translations of the portions of foreign language text to a preferred language of the user and transmitting, to the client computing device, the translated portions of text.

14 Claims, 2 Drawing Sheets

(56) References Cited

U.S. PATENT DOCUMENTS

| | | | |
|---|---|---|---|
| 2002/0198991 A1* | 12/2002 | Gopalakrishnan | G06F 17/30902 709/225 |
| 2003/0140316 A1* | 7/2003 | Lakritz | G06F 17/2258 715/201 |
| 2008/0085724 A1* | 4/2008 | Cormier | H04L 67/18 455/456.1 |
| 2009/0287671 A1* | 11/2009 | Bennett | G06F 17/289 |
| 2009/0319166 A1 | 12/2009 | Khosravy et al. | |
| 2010/0125410 A1* | 5/2010 | Hicks | B61L 25/025 701/533 |
| 2010/0153007 A1 | 6/2010 | Crowley | |
| 2011/0046941 A1* | 2/2011 | Manuel-Devados | G06F 17/289 704/3 |
| 2011/0125483 A1* | 5/2011 | Manuel-Devadoss | G06F 17/289 704/2 |
| 2012/0010816 A1* | 1/2012 | Uyama | G01C 21/3446 701/527 |
| 2012/0179448 A1 | 7/2012 | Gupta et al. | |
| 2012/0289156 A1* | 11/2012 | Boudville | G06F 17/289 455/41.2 |
| 2013/0144900 A1* | 6/2013 | Murphy | G06F 17/30401 707/760 |
| 2013/0282360 A1* | 10/2013 | Shimota | G06F 17/28 704/7 |
| 2013/0344896 A1* | 12/2013 | Kirmse | G06F 17/3087 455/456.3 |
| 2014/0005921 A1 | 1/2014 | Voronel et al. | |
| 2014/0200038 A1* | 7/2014 | Rao | H04L 67/2847 455/457 |
| 2014/0222950 A1* | 8/2014 | Rabel | G01C 21/32 709/217 |
| 2014/0337007 A1 | 11/2014 | Waibel et al. | |
| 2014/0342772 A1* | 11/2014 | Mulcahy | H04W 88/06 455/553.1 |
| 2014/0358518 A1* | 12/2014 | Wu | G06F 17/2836 704/3 |
| 2015/0294427 A1* | 10/2015 | Han | G01C 21/3679 707/754 |
| 2016/0044127 A1* | 2/2016 | Filner | H04L 67/2847 709/213 |
| 2017/0059348 A1* | 3/2017 | Nishikawa | G01C 21/3626 |

\* cited by examiner

TECHNIQUES FOR PROACTIVELY PROVIDING TRANSLATED TEXT TO A TRAVELING USER

FIELD

The present disclosure relates to language translation and, more particularly, to techniques for proactively providing translated text to a traveling user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a user is traveling in a region that utilizes a language that she/he does not fully understand (e.g., a foreign language), the user may want to translate text in the foreign language to a language that he/she prefers. For example, the user may want to translate foreign language text from a street sign while navigating the region. The user would typically use a computing device (e.g., their mobile phone) to obtain the translation of the foreign language text. While traveling in certain portions of the region, however, their computing device may be unable to connect to a network to obtain the translation. Some translation systems allow a user to download a dictionary or the like (e.g., translation cards) for the region, but this is very simplistic and is not particularly effective in assisting the user.

SUMMARY

According to a first aspect of the present disclosure, a computer-implemented technique is presented. The technique can include obtaining, by a server computing device having one or more processors, future travel plans for a user associated with a client computing device, the future travel plans being in a region that utilizes a language that is foreign to the user; predicting, by the server computing device and based on the future travel plans, an expected future offline period during which the user is unlikely to have access to a network connection via the client computing device; identifying, by the server computing device, one or more points of interest in future the travel plans corresponding to the expected future offline period, each point of interest being indicative of a location where the user is likely to require translation of foreign language text; obtaining, by the server computing device, portions of foreign language text associated with the one or more points of interest; obtaining, by the server computing device prior to the expected future offline period, translated portions of text representing translations of the portions of foreign language text to a preferred language of the user; and transmitting, from the server computing device and to the client computing device prior to the expected future offline period, the translated portions of text.

According to a second aspect of the present disclosure, a server computing device is presented. The server computing device can include one or more processors and a non-transitory memory having instructions stored thereon that, when executed by the one or more processors, causes the server computing device to perform operations. The operations can include obtaining future travel plans for a user associated with a client computing device, the future travel plans being in a region that utilizes a language that is foreign to the user; predicting, based on the future travel plans, an expected future offline period during which the user is unlikely to have access to a network connection via the client computing device; identifying one or more points of interest in future the travel plans corresponding to the expected future offline period, each point of interest being indicative of a location where the user is likely to require translation of foreign language text; obtaining portions of foreign language text associated with the one or more points of interest; obtaining, prior to the expected future offline period, translated portions of text representing translations of the portions of foreign language text to a preferred language of the user; and transmitting, to the client computing device prior to the expected future offline period, the translated portions of text.

According to a third aspect of the present disclosure, a non-transitory computer-readable medium is presented. The computer-readable medium can have a set of instructions stored thereon that, when executed by one or more processors of a server computing device, causes the server computing device to perform operations. The operations can include obtaining future travel plans for a user associated with a client computing device, the future travel plans being in a region that utilizes a language that is foreign to the user; predicting, based on the future travel plans, an expected future offline period during which the user is unlikely to have access to a network connection via the client computing device; identifying one or more points of interest in future the travel plans corresponding to the expected future offline period, each point of interest being indicative of a location where the user is likely to require translation of foreign language text; obtaining portions of foreign language text associated with the one or more points of interest; obtaining, prior to the expected future offline period, translated portions of text representing translations of the portions of foreign language text to a preferred language of the user; and transmitting, to the client computing device prior to the expected future offline period, the translated portions of text.

In some embodiments, receipt of the translated portions of text causes the client computing device to store the translated portions of text in a memory for future retrieval and output. In some embodiments, receipt of the translated portions of text further causes the client computing device to retrieve and output a specific translated portion of text at a time or location corresponding to an associated point of interest.

In some embodiments, the technique/operations further comprise crawling, by the server computing device, the Internet to determine the portions of foreign language text associated with each point of interest. In some embodiments, the expected future offline period is defined between two overnight stays by the user at one or more hotels, and wherein the server computing device obtains and transmits the translated portions of text to the client computing device during a first of the two overnight stays.

In some embodiments, obtaining the future travel plans includes utilizing a registered profile of the user to extract the future travel plans from at least one of (i) emails associated with the user, (ii) a calendar associated with the user, and (iii) social media activity associated with the user. In some embodiments, obtaining the future travel plans further includes utilizing at least one of (i) global positioning system (GPS) information indicative of a location of the user, (ii) past travel habits of the user, and (iii) statistics of other users' travel habits in the region.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, a user traveling in a region that utilizes a foreign language may want to translate text in the foreign language. At a minimum, the user may require certain translated portions of foreign language text in order to adequately function while traveling in the region. Non-limiting examples of the tasks that the user must be able to do in order to adequately function in the region include navigating, eating, and complying with local rules/regulations. Non-limiting examples of the associated texts include street signs, maps, menus, and warning indicators. Computer translation is typically performed by the user "on the fly" using their computing device (e.g., their mobile phone) and a network connection. When the network connection is unavailable, however, the user may be unable to obtain such translated text. Accordingly, improved techniques are presented that proactively provide the user with translated text. These techniques can leverage known information about the user's future travel plans in order to proactively translate text and deliver the translated text to their computing device.

These techniques can be performed automatically and with little to no user involvement or interaction. The translated text can be stored and retrieved when needed via the computing device (before an event, during an event, after an event, etc.). The specific text that is translated can be portions of text that the user is likely to require in the future. Non-limiting examples of this text include step-by-step directions and menu items. These techniques can also leverage this known travel information to ascertain when the user is likely to have a network connection for their computing device. Non-limiting examples of locations where the user is likely to have a network connection include hotels and coffee shops. Thus, if it is anticipated that the user will have a network connection each evening (e.g., at their hotel), then the proactive translation and delivery of translated text may only need to be performed for the following day. For example, this could all be performed overnight while the user is sleeping.

Figure 1:
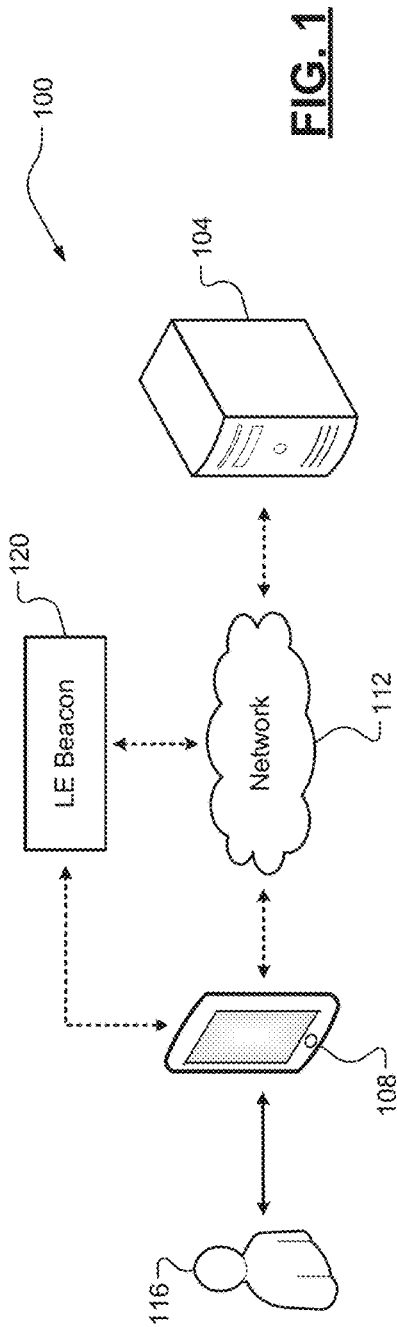
FIG. 1 is a diagram of an example computing network according to some implementations of the present disclosure.

Referring now to FIG. 1, an example of a computing network 100 is illustrated. The computing network 100 can include a server computing device 104 that can communicate with a client computing device 108 via a network 112 and/or the LE beacon 120. The server computing device 104 can implement at least a portion of the techniques of the present disclosure. The term "server computing device" as used herein can refer to both a single server computing device and multiple server computing devices operating in a parallel or distributed architecture. A user 116 can operate the client computing device 108, which can be any suitable computing device, but is most likely a mobile computing device (a laptop computer, a tablet computer, or a mobile phone). Non-limiting examples of the network 112 include a local area network (LAN), a wide area network (WAN), e.g., the Internet, a cellular network, a packet switched telephone network (PSTN), and any combinations thereof. In some implementations, a low-energy (LE) beacon 120 can communicate with the client computing device 108 (and in some cases, the network 112).

Figure 2:
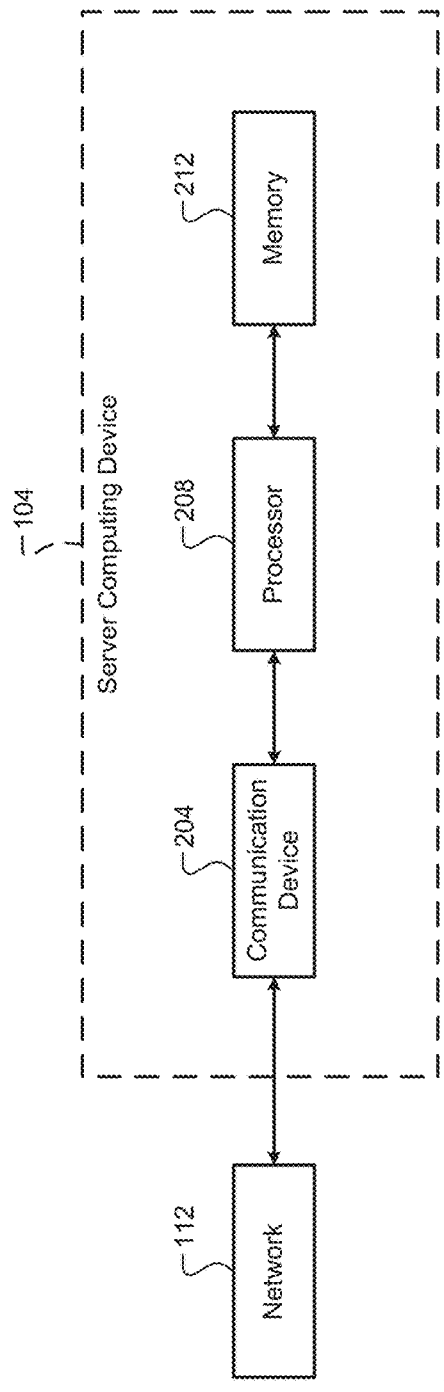
FIG. 2 is a functional block diagram of an example server computing device of FIG. 1.

Referring now to FIG. 2, a functional block diagram of an example configuration of the server computing device 104 is illustrated. It will be appreciated that the client computing device 108 can have the same or similar configuration as the server computing device 104. A communication device 200 (e.g., a wireless transceiver) can be configured for communication via the network 112. A processor 204 can be configured to control operation of the server computing device 104. The term "processor" as used herein can refer to both a single processor and multiple processors operating in a parallel or distributed architecture. A non-transitory memory or computer-readable medium 208 (flash, hard disk, etc.) can be configured to store information at the server computing device 104, such as a set of instructions that, when executed by the processor 204, causes the server computing device 104 to perform at least a portion of the techniques of the present disclosure.

The server computing device 104 can initially determine future travel plans for the user 116. This can include any information indicative of where the user 116 is expected to be in the future. The travel information can be retrieved, for example, via a registered profile of the user 116. In some implementations, this registered profile is hosted and maintained by the server computing device 104. These travel plans can also be indicative of languages spoken in a particular region. A degree of confidence about which language(s) is/are spoken in a particular region can be a factor in the aggressiveness of automatically obtaining/offloading/serving translated text to the user 116. The travel information, for example, can be compiled using emails and calendar information. Other sources could also be utilized to obtain this travel information, such as social media postings, past/current/future global positioning system (GPS) coordinates, and/or past travel history. Statistical analysis of particular locations could also be used, such as to determine popular locations visited by tourists/travelers to a given region. For example only, the user 116 may have booked airline tickets to Italy and reserved a hotel in Italy, and this information could be determined via associated confirmation emails and/or calendar entries. The flight (i.e., the airports) and the hotel can both be referred to as points of interest. The phrase "points of interest" as used herein can refer to any locations where the user 116 is expected to visit. More examples of points of interest include businesses (e.g., for meetings), subway/train/bus stations (e.g., for transportation), restaurants, and other planned activities (e.g., landmarks to visit).

After the server computing device 104 determines the future travel plans for the user 116, it can predict an expected future offline period during which the user 116 is unlikely to have access to the network 112 via their computing device 108. In predicting whether the user 116 is likely to have access to the network 112 during a future period, the server computing device 104 weigh a variety of factors. In one implementation, the server computing device 104 can determine an expected path of travel or an expected route of the user 116 during the future time period. There may be points of interest nearby the expected route of the user 116 that would give she/he access to the network 112. For example, a coffee shop that provides access to the network 112 may be located along the expected route. Thus, in such implementations, the server computing device 104 can calculate a probability score indicative of a likelihood that the user 116 will not have access to the network during the future period. When this probability score exceeds a threshold indicative of an acceptable degree of confidence that the user 116 will not have access to the network 112 during the future period, the server computing device 104 could deem this an expected future offline period. In other words, if the user 116 is expected to have access to the network 112 (e.g., a WiFi connection) at some point, then the entire period is not an expected future offline period. One or both periods before and after the time at which the user 116 is expected to have network access, however, could be expected future offline periods. Because network access is expected, however, translated text could only be pre-obtained and provided for expected activities up until the point of the network access.

After determining the expected future offline period, the server computing device 104 can determine points of interest during this expected future offline period. Each point of interest can be a location at which the user 116 is likely to require translation of foreign language text. As discussed above, each point of interest may be along a travel path or travel route of the user 116. Non-limiting examples of the points of interest include locations of scheduled events, such as hotels, restaurants, and business meetings, as well as popular attractions, such as landmarks in the region. The server computing device 104 or another computer system can crawl the network 112 (e.g., the Internet) to determine portions of foreign language text associated with each point of interest. Each portion of foreign language text can be a portion of foreign language text that likely requires translation or, in other words, there is likely no translated version of the foreign language text for the user 116. For example, if a restaurant in Italy is well-known to have an English version of their menu, then the Italian text would not be obtained for translation. Non-limiting examples of content for translation include menus, navigational materials (signs/maps/directions), plaques or posters at landmarks, such as monuments and exhibits, and guided tour instructions.

After obtaining the portions of foreign language text, the server computing device 104 can obtain translations of the portions of foreign language text to a language that is preferred by the user 116. These obtained translations can be referred to as translated portions of text. The server 104 itself or another machine translation system could perform the machine translation of the portions of foreign language text. Once obtained, the server computing device 104 can then deliver the translated portions of text to the client computing device 108. This can be performed by transmission via the network 112. The translation and delivery of the translated portions of text should occur before the expected future offline period. One example period to "download" the translated portions of text to the user 116 is during an overnight hotel stay. As most hotels have free or inexpensive WiFi, this may be an ideal time for an non-intrusive download of the translated portions of text. As previously mentioned, this process can all occur unbeknownst to the user 116. Upon receipt, the client computing device 108 can store the translated portions of text in memory for subsequent retrieval and output to the user 116.

The output of the translated portions of text by the client computing device 116 can vary. More particularly, the timing of the output of the translated text could be varied such that the translated text is available to the user 116 at the most appropriate time. In some implementations, machine-learned models for determining the optimal output time for a particular scenario (e.g., a type of the location and/or a type of the translated text) could be created and periodically updated. Location data (e.g., GPS location) could also be leveraged to output the translated text to the user 116 at the optimal time. For example only, a geo-fence around a particular location could be utilized (i.e., when crossed) in outputting the translated text. Some translated text may be best output to the user 116 before an event. For example, the translated text may be a translation of a local city map for use by the user 116 in navigating to a restaurant where she/he has a reservation. Other translated text may be best output to the user 116 during or at a start the event. For example, the translated text may be a translation of the restaurant menu. Other translated text may be best output to the user 116 after the event. For example, the translated text may be regarding asking for a check or to order a cab. The determination of the optimal time to output the translated text at the client computing device 108 could be made by the device itself, as indicated by previously-received instructions from the server computing device 104, or some combination thereof.

Figure 3:
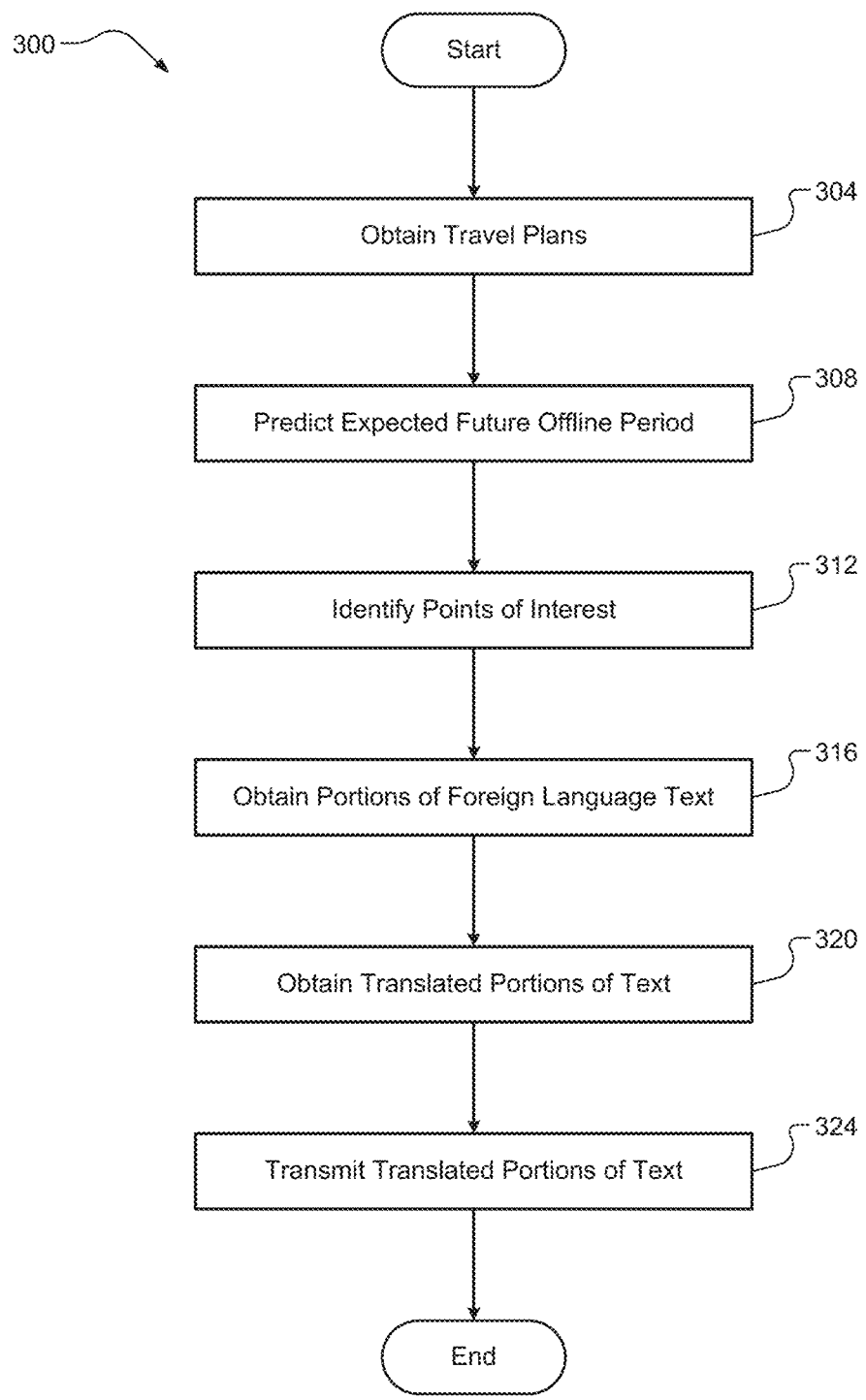
FIG. 3 is a flow diagram of an example technique for proactively providing translated text according to some implementations of the present disclosure.

Referring now to FIG. 3, a flow diagram of an example technique 300 for proactively providing translated text is illustrated. At 304, the server computing device 104 can obtain future travel plans for the user 116 in a region that utilizes a language that is foreign to the user 116. At 308, the server computing device 104 can predict, based on the future travel plans, an expected future offline period during which the user 116 is unlikely to have access to the network 112 via their computing device 108. At 312, the server computing device can identify, based on the future travel plans, points of interest in the travel plans corresponding to the expected future offline period, each point of interest being indicative of a location where the user 116 is likely to require translation of foreign language text. At 316, the server computing device 104 can obtain portions of foreign language text associated with the points of interest. At 320, the server computing device 104 can, prior to the expected future offline period, obtain translated portions of text representing translations of the portions of foreign language text to a preferred language of the user 116. At 324, the server computing device 104 can, prior to the expected future offline period, transmit the translated portions of text to the client computing device 108. The technique 300 can then end or return to 304 for one or more additional cycles.

In some implementations, the LE beacon 120 (e.g., a Bluetooth LE wireless beacon) or another suitable wireless beacon could be utilized to provide the user 116 with at least some of the translated text that she/he is expected to need during their travels. More particularly, locations could utilize the LE beacon 120 to provide translated text to the client computing device 108 when in proximity and configured for Bluetooth communication (e.g., via a universally unique identifier, or UUID). This information could include, for example, common text relating to the location. One example would be translated text of a menu at a restaurant. This translated text could be stored at the LE beacon 120 and output to the client computing device 108. This output, for example, could be in response to a request from the client computing device. In some implementations, the LE beacon 120 may store translated text for only certain languages (e.g., popular languages, such as English). It will be appreciated, however, that the LE beacon 120 could have access to the network 112 to obtain translated text in other languages. The known presence/information about LE beacons at locations in the user's travel path could be leveraged in order to offload less translated text to the client computing device 108 because the client computing device 108 could instead obtain it on-site from the LE beacon(s).

Further to the descriptions above, a user may be provided with controls allowing the user to make an election as to both if and when systems, applications, or features described herein may enable collection of user information (information about a user's location, information about a user's travel plans, billing/financial information of the user, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is subsequently provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   obtaining, by a server computing device having one or more processors, data specifying future travel plans for a user associated with a client computing device, the future travel plans being in a region that utilizes a language that is foreign to the user;
   predicting, by the server computing device and based on the future travel plans, an expected future offline period during which the client computing device is unlikely to have a network connection;
   determining, by the server computing device, an expected path of travel during the future offline period;
   identifying, by the server computing device, one or more points of interest along the expected path of travel, each point of interest being indicative of a specific location where the user is likely to require translation of foreign language text, wherein identifying a particular point of interest as one of the one or more points of interest is based on (1) known information about the availability of translated foreign language text at the particular point of interest, and (2) a likelihood that the user will require translation of foreign language text at the particular point of interest exceeding a threshold likelihood;
   obtaining, by the server computing device, portions of foreign language text associated with the one or more points of interest, wherein each portion of foreign language text is intended to aid the user while he/she is at the corresponding point of interest;
   obtaining, by the server computing device and prior to the expected future offline period, translated portions of text representing translations of the portions of foreign language text to a preferred language of the user; and
   transmitting, from the server computing device and to the client computing device prior to the expected future offline period, the translated portions of text and instructions for outputting the translated portions of text,
   wherein receipt of the translated portions of text and the instructions causes the client computing device to:
      determine an output time or an output location specified by a particular instruction of the transmitted instructions,
      detect that an output condition is satisfied when a current time or a current location of the client computing device matches the output time or the output location,
      generate a rendered display comprising the translated portions of text, and
      display, on a display of the client computing device, the rendered display in response to detecting that the output condition is satisfied.

2. The computer-implemented method of claim 1, wherein the expected future offline period is defined between two overnight stays by the user at one or more hotels, and wherein the server computing device obtains and transmits the translated portions of text to the client computing device during a first of the two overnight stays.

3. The computer-implemented method of claim 1, wherein obtaining the future travel plans includes utilizing a registered profile of the user to extract the future travel plans from at least one of (i) emails associated with the user, (ii) a calendar associated with the user, and (iii) social media activity associated with the user.

4. The computer-implemented method of claim 3, wherein obtaining the future travel plans further includes utilizing at least one of (i) global positioning system (GPS) information indicative of a location of the user, (ii) past travel habits of the user, and (iii) statistics of other users' travel habits in the region.

5. A server computing device including one or more processors and a non-transitory memory having instructions stored thereon that, when executed by the one or more processors, causes the server computing device to perform operations comprising:
   obtaining data specifying future travel plans for a user associated with a client computing device, the future travel plans being in a region that utilizes a language that is foreign to the user;
   predicting, based on the future travel plans, an expected future offline period during which the client computing device is unlikely to have a network connection;
   determining an expected path of travel by the user during the expected future offline period;
   identifying one or more points of along the expected path of travel, each point of interest being indicative of a specific location where the user is likely to require translation of foreign language text, wherein identifying a particular point of interest as one of the one or more points of interest is based on (1) known information about the availability of translated foreign language text at the particular point of interest, and (2) a likelihood that the user will require translation of foreign language text at the particular point of interest exceeding a threshold likelihood;

obtaining portions of foreign language text associated with the one or more points of interest, wherein each portion of foreign language text is intended to aid the user while he/she is at the corresponding point of interest;

obtaining, prior to the expected future offline period, translated portions of text representing translations of the portions of foreign language text to a preferred language of the user; and transmitting, to the client computing device prior to the expected future offline period, the translated portions of text and instructions for outputting the translated portions of text, wherein receipt of the translated portions of text and the instructions causes the client computing device to:
  determine an output time or an output location specified by a particular instruction of the transmitted instructions,
  detect that an output condition is satisfied when a current time or a current location of the client computing device matches the output time or the output location,
  generate a rendered display comprising the translated portions of text, and
  display, on a display of the client computing device, the rendered display in response to detecting that the output condition is satisfied.

6. The server computing device of claim 5, wherein the expected future offline period is defined between two overnight stays by the user at one or more hotels, and wherein the server computing device obtains and transmits the translated portions of text to the client computing device during a first of the two overnight stays.

7. The server computing device of claim 5, wherein obtaining the future travel plans includes utilizing a registered profile of the user to extract the future travel plans from at least one of (i) emails associated with the user, (ii) a calendar associated with the user, and (iii) social media activity associated with the user.

8. The server computing device of claim 7, wherein obtaining the future travel plans further includes utilizing at least one of (i) global positioning system (GPS) information indicative of a location of the user, (ii) past travel habits of the user, and (iii) statistics of other users' travel habits in the region.

9. A non-transitory computer-readable medium having a set of instructions stored thereon that, when executed by one or more processors of a server computing device, causes the server computing device to perform operations comprising:
  obtaining data specifying future travel plans for a user associated with a client computing device, the future travel plans being in a region that utilizes a language that is foreign to the user;
  predicting, based on the future travel plans, an expected future offline period during which the client computing device is unlikely to have a network connection;
  determining an expected path of travel by the user during the expected future offline period;
  identifying one or more points of interest along the expected path of travel, each point of interest being indicative of a specific location where the user is likely to require translation of foreign language text, wherein identifying a particular point of interest as one of the one or more points of interest is based on (1) known information about the availability of translated foreign language text at the particular point of interest, and (2) a likelihood that the user will require translation of foreign language text at the particular point of interest exceeding a threshold likelihood;
  obtaining portions of foreign language text associated with the one or more points of interest, wherein each portion of foreign language text is intended to aid the user while he/she is at the corresponding point of interest;
  obtaining, prior to the expected future offline period, translated portions of text representing translations of the portions of foreign language text to a preferred language of the user; and
  transmitting, to the client computing device prior to the expected future offline period, the translated portions of text and instructions for outputting the translated portions of text,
  wherein receipt of the translated portions of text and the instructions causes the client computing device to:
    determine an output time or an output location specified by a particular instruction of the transmitted instructions,
    detect that an output condition is satisfied when a current time or a current location of the client computing device matches the output time or the output location,
    generate a rendered display comprising the translated portions of text, and
    display, on a display of the client computing device, the rendered display in response to detecting that the output condition is satisfied.

10. The computer-readable medium of claim 9, wherein the expected future offline period is defined between two overnight stays by the user at one or more hotels, and wherein the server computing device obtains and transmits the translated portions of text to the client computing device during a first of the two overnight stays.

11. The computer-readable medium of claim 9, wherein obtaining the future travel plans includes:
  utilizing a registered profile of the user to extract the future travel plans from at least one of (i) emails associated with the user, (ii) a calendar associated with the user, and (iii) social media activity associated with the user; and
  utilizing at least one of (i) global positioning system (GPS) information indicative of a location of the user, (ii) past travel habits of the user, and (iii) statistics of other users' travel habits in the region.

12. The computer-implemented method of claim 1, wherein at least some of the portions of foreign language text include step-by-step directions for the user with respect to the path of travel.

13. The server computing device of claim 5, wherein at least some of the portions of foreign language text include step-by-step directions for the user with respect to the path of travel.

14. The computer-readable medium of claim 9, wherein at least some of the portions of foreign language text include step-by-step directions for the user with respect to the path of travel.

* * * * *